US012221828B2

(12) United States Patent
Wei et al.

(10) Patent No.: US 12,221,828 B2
(45) Date of Patent: Feb. 11, 2025

(54) ELECTRONIC DOOR PLATE AND SYSTEM FOR MANAGING ELECTRONIC DOOR PLATE

(71) Applicant: BOE Technology Group Co., Ltd., Beijing (CN)

(72) Inventors: Jinggang Wei, Beijing (CN); Lei Cao, Beijing (CN); Yunpeng Wu, Beijing (CN); Yan Ren, Beijing (CN); Zifeng Wang, Beijing (CN); Junmin Sun, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 997 days.

(21) Appl. No.: 17/186,099

(22) Filed: Feb. 26, 2021

(65) Prior Publication Data

US 2021/0372197 A1 Dec. 2, 2021

(30) Foreign Application Priority Data

May 29, 2020 (CN) ......................... 202020962174.7

(51) Int. Cl.
*E06B 7/28* (2006.01)
*G08B 25/10* (2006.01)

(52) U.S. Cl.
CPC ................ *E06B 7/28* (2013.01); *G08B 25/10* (2013.01)

(58) Field of Classification Search
CPC ................................. E06B 7/28; G08B 25/10
USPC ........................................................ 340/328
See application file for complete search history.

(56) References Cited

U.S. PATENT DOCUMENTS

| | | | | |
|---|---|---|---|---|
| 7,847,878 | B2 * | 12/2010 | Kobayashi | H04M 1/0266 349/58 |
| 11,675,160 | B1 * | 6/2023 | England | H04N 7/186 359/871 |
| 2008/0100805 | A1 * | 5/2008 | Majumder | G06F 3/1446 353/30 |
| 2008/0136313 | A1 * | 6/2008 | Van De Ven | F21K 9/62 313/500 |
| 2014/0062714 | A1 * | 3/2014 | Chvatal | G08B 5/38 340/815.73 |
| 2015/0116507 | A1 * | 4/2015 | Sagerian | H04N 5/64 348/189 |
| 2016/0171847 | A1 * | 6/2016 | Parker | G08B 3/10 340/326 |
| 2016/0334665 | A1 * | 11/2016 | Nakazawa | G02F 1/133308 |
| 2017/0084132 | A1 * | 3/2017 | Scalisi | G08B 3/10 |
| 2018/0059694 | A1 * | 3/2018 | Rezny | F24F 11/30 |
| 2018/0082573 | A1 * | 3/2018 | Zuckerman | G16H 40/20 |
| 2018/0136675 | A1 * | 5/2018 | Marschalkowski | H02H 3/00 |

(Continued)

*Primary Examiner* — Naomi J Small
(74) *Attorney, Agent, or Firm* — WHDA, LLP

(57) ABSTRACT

An electronic door plate and a system for managing an electronic door plate. The electronic door plate particularly includes: a center frame, a circuit board, a display screen, a back cover and an alarming device; the circuit board, the display screen and the alarming device are fixed to the center frame; the back cover is provided on one side of the center frame that is further away from the display screen, and is fixedly connected to the center frame; a controlling module is provided at the circuit board, and the controlling module is electrically connected to the alarming device; and the controlling module is configured for controlling the alarming device to perform an alarming operation.

15 Claims, 2 Drawing Sheets

(56) References Cited

U.S. PATENT DOCUMENTS

| | | | | |
|---|---|---|---|---|
| 2019/0074676 | A1* | 3/2019 | Beghelli | H05B 47/19 |
| 2019/0172578 | A1* | 6/2019 | Zuckerman | G16H 40/20 |
| 2020/0110308 | A1* | 4/2020 | Hattori | G06F 1/1696 |
| 2020/0177997 | A1* | 6/2020 | Gomes | H04R 7/045 |
| 2020/0280798 | A1* | 9/2020 | Gomes | H04R 7/16 |

* cited by examiner

ELECTRONIC DOOR PLATE AND SYSTEM FOR MANAGING ELECTRONIC DOOR PLATE

CROSS REFERENCE TO RELEVANT APPLICATIONS

The present disclosure claims the priority of the Chinese patent application filed on May 29, 2020 before the Chinese Patent Office with the application number of 202020962174.7 and the title of "ELECTRONIC DOOR PLATE AND SYSTEM FOR MANAGING ELECTRONIC DOOR PLATE", which is incorporated herein in its entirety by reference.

TECHNICAL FIELD

The present disclosure relates to the technical field of electronic devices, and particularly relates to an electronic door plate and a system for managing an electronic door plate.

BACKGROUND

Electronic door plates can be used to display room numbers and room states (Occupied/Not Occupied, Do Not Disturb, Cleanup Now, and so on), and integrate functions such as touch-controlled doorbell button. Therefore, they are extensively applied in places such as hotels, hospitals and offices.

SUMMARY

The present disclosure provides an electronic door plate and a system for managing an electronic door plate.

In a first aspect, the present disclosure provides an electronic door plate, wherein the electronic door plate comprises: a center frame, a circuit board, a display screen, a back cover and an alarming device;

the circuit board, the display screen and the alarming device are fixed to the center frame;

the back cover is provided on one side of the center frame that is further away from the display screen, and is fixedly connected to the center frame;

a controlling module is provided at the circuit board, and the controlling module is electrically connected to the alarming device; and the controlling module is configured for controlling the alarming device to perform an alarming operation.

Optionally, the alarming device comprises: at least one of a sound alarming device and a lamplight alarming device.

Optionally, the lamplight alarming device is fixed to a side wall of the center frame.

Optionally, the lamplight alarming device comprises: a light bar and a light-bar cover plate;

the light bar is fixed to the side wall of the center frame, and is electrically connected to the controlling module; and the light-bar cover plate covers the light bar.

Optionally, a slot is provided on one side of the light-bar cover plate that is closer to the light bar, and a diffusing soft-rubber structure is embedded in the slot.

Optionally, the diffusing soft-rubber structure is made from a polyvinyl chloride, a polyamide elastomer, a polyolefin elastomer or a polyurethane elastomer each of which is added a light diffusant.

Optionally, the light-bar cover plate is a transparent light-bar cover plate.

Optionally, the back cover is provided with a through hole at a position corresponding to the lamplight alarming device, and the light-bar cover plate is embedded in the through hole.

Optionally, the sound alarming device is a buzzer.

Optionally, the electronic door plate further comprises: a cover plate, and the cover plate covers the display screen, and is fixedly connected to the center frame.

Optionally, the electronic door plate further comprises: a communication module, and the communication module is configured for being wirelessly connected to a target device, and receiving an operating instruction sent by the target device; and the controlling module is electrically connected to the communication module, and the controlling module is configured for, in response to the operating instruction sent by the target device and received by the communication module, controlling the alarming device to perform an alarming operation.

Optionally, the electronic door plate further comprises: a manipulating button, and the manipulating button is configured for receiving an operating instruction of a user; and the controlling module is electrically connected to the manipulating button, and the controlling module is configured for, in response to the operating instruction of the user received by the manipulating button, controlling the alarming device to perform an alarming operation.

Optionally, the display screen is an electronic-paper display screen.

Optionally, at least one of a light color and a flicker frequency of the lamplight alarming device corresponds to a type of an operating instruction of an operator.

Optionally, the light bar is provided with one elongate light emitting source, or is provided with a plurality of granular light emitting sources.

Optionally, a flanging part is provided on one side of the diffusing soft-rubber structure that is closer to the light bar, and the flanging part protrudes out of the slot.

Optionally, the light-bar cover plate is provided with a blocking flange at a position corresponding to the flanging part, and the blocking flange clings to and is connected to the flanging part.

Optionally, the back cover is provided with a sound emitting hole at a position corresponding to the buzzer.

Optionally, the controlling module is a chip or controlling circuit provided at the circuit board.

In a second aspect, the present disclosure further discloses a system for managing an electronic door plate, wherein the system comprises: a calling machine, an upper computer and the electronic door plate stated above; and the electronic door plate, the calling machine and the upper computer are wirelessly connected.

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present disclosure or the related art, the figures that are required to describe the embodiments or the related art will be briefly introduced below. Apparently, the figures that are described below are merely embodiments of the present disclosure, and a person skilled in the art can obtain other figures according to these figures without paying creative work.

DETAILED DESCRIPTION

In order to make the above purposes, features and advantages of the present disclosure more apparent and understandable, the present disclosure will be described in further detail below with reference to the drawings and the particular embodiments. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

An embodiment of the present disclosure provides an electronic door plate. The electronic door plate may be used in places such as hotels, hospitals and offices. The embodiments of the present disclosure merely describe by taking the case in which the electronic door plate is used in a hospital as the example, and other application scenes may refer to that.

Figure 1:
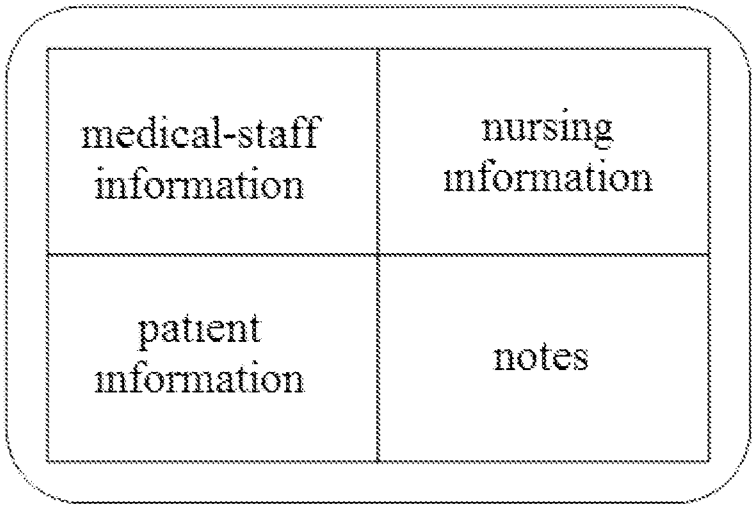
FIG. 1 is a schematic structural diagram of an electronic door plate according to the present disclosure.
Figure 2:
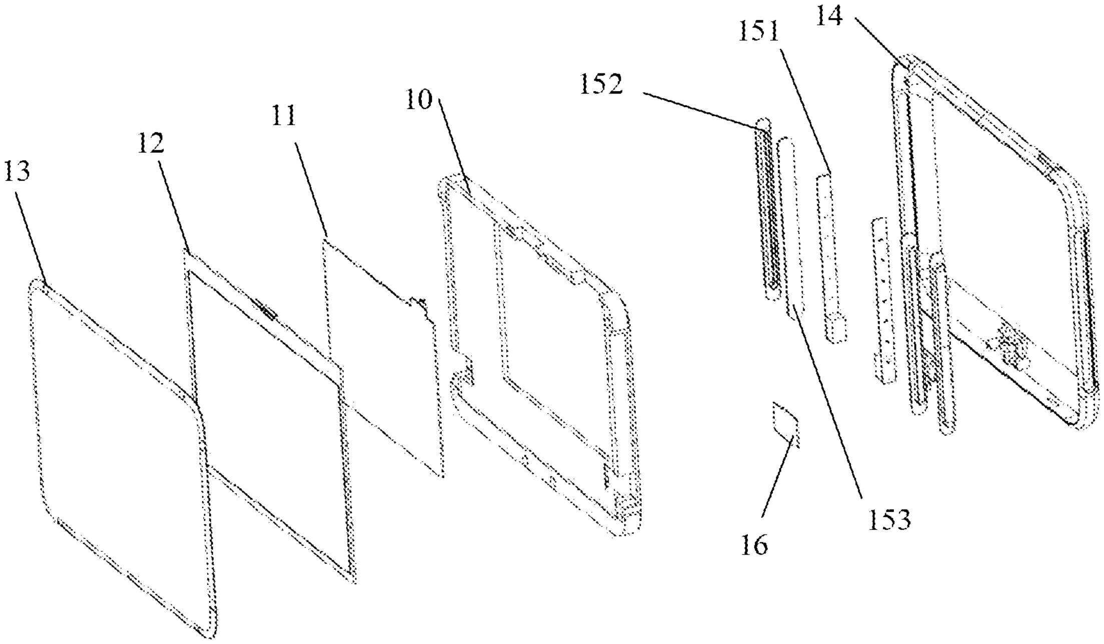
FIG. 2 is an exploded schematic structural diagram of the electronic door plate shown in FIG. 1.
Figure 3:
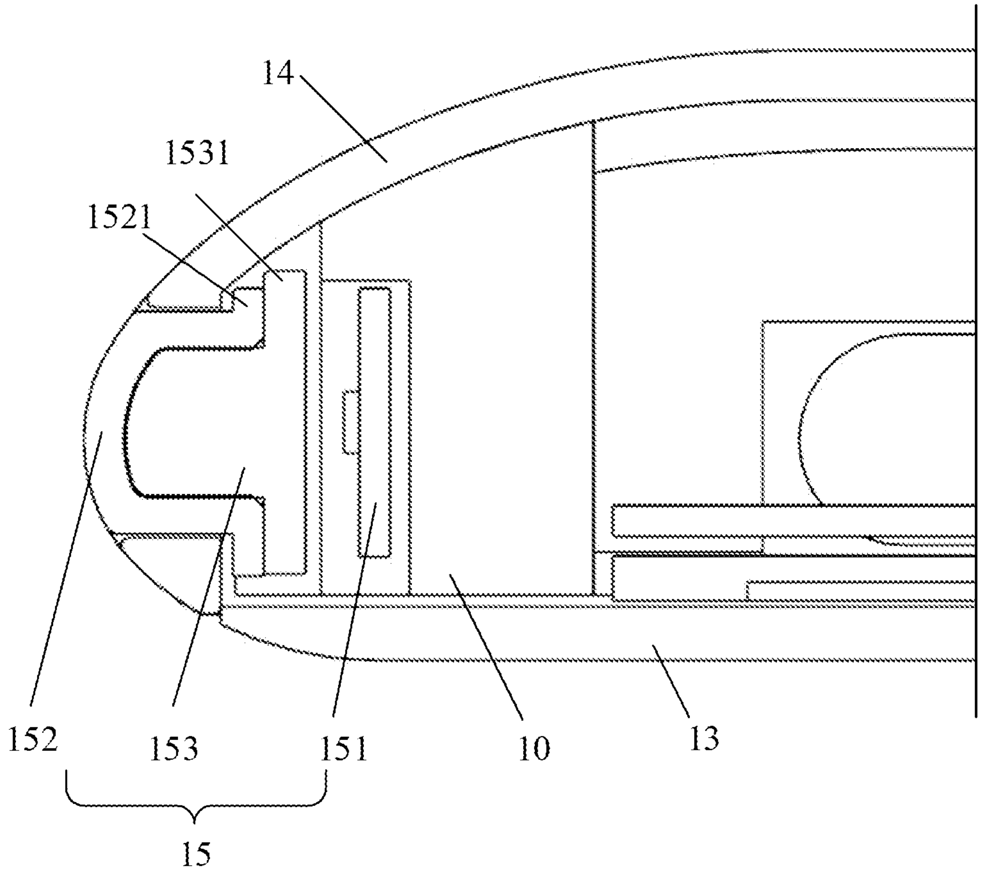
FIG. 3 is a sectional schematic structural diagram of the electronic door plate shown in FIG. 1.

Referring to FIG. 1, FIG. 1 shows a schematic structural diagram of an electronic door plate according to the present disclosure. Referring to FIG. 2, FIG. 2 shows an exploded schematic structural diagram of the electronic door plate shown in FIG. 1. Referring to FIG. 3, FIG. 3 shows a sectional schematic structural diagram of the electronic door plate shown in FIG. 1. The electronic door plate may particularly comprise: a center frame 10, a circuit board 11, a display screen 12, a back cover 14 and an alarming device.

The circuit board 11, the display screen 12 and the alarming device are fixed to the center frame 10.

The back cover 14 is provided on one side of the center frame 10 that is further away from the display screen 12, and is fixedly connected to the center frame 10.

A controlling module (not shown in the figures) is provided at the circuit board 11, the controlling module is electrically connected to the alarming device, and the controlling module may be configured for controlling the alarming device to perform an alarming operation.

Particularly, the back cover 14 may be fixedly connected to the side of the center frame 10 that is further away from the display screen 12 by using a fastener such as a screw and a bolt, to improve the reliability of the connection between the center frame 10 and the back cover 14. The center frame 10 may be provided inside the accommodating space that is enclosed by a cover plate 13 and the back cover 14, to serve as the main support of the electronic door plate. The center frame 10 can increase the overall strength of the electronic door plate.

In practical applications, the electronic door plate may further comprise a cover plate 13. The cover plate 13 covers the display screen 12, and is fixedly connected to the center frame 10. Particularly, the cover plate 13 may be fixed to the center frame 10 by adhesion.

In the embodiment of the present disclosure, by providing the alarming device in the electronic door plate, by the controlling of the controlling module at the circuit board 11, the alarming device can perform an alarming operation, to facilitate the operator to quickly locate the room corresponding to the electronic door plate. In other words, besides the traditional functions of interactive operation such as displaying and touch controlling, the electronic door plate further has the functions of prompting and locating, which diversifies the functions.

As shown in FIG. 1, in a case in which the electronic door plate is used in a hospital, the electronic door plate may display patient information, medical-staff information, notes and so on. In practical applications, the electronic door plate may be wirelessly connected to an upper computer located in a nursing station or a doctor office, which facilitates the medical staff to change the contents displayed on the electronic door plate from the nursing station or the doctor office. Certainly, the display screen 12 may also integrate the function of touch-controlling operation, which facilitates the medical staff to change the displayed contents by a touch-controlling operation on the display screen 12.

It can be understood that, in cases in which the electronic door plate is used in other scenes such as an office, the contents displayed on the electronic door plate may be correspondingly adjusted. The application scene and the displayed contents of the electronic door plate are not particularly limited in the embodiments of the present disclosure.

Particularly, the display screen 12 may be an electronic-paper display screen, such as an electrophoretic electronic paper (EPD). Because electrophoretic display screens have the characteristic that they do not consume electric power in normal displaying, and merely consume electric power when changing the displayed contents, and thus have a low power consumption, using an electrophoretic display screen as the display screen 12 can greatly reduce the power consumption of the display screen 12, and, correspondingly, can reduce the power consumption of the electronic door plate.

In an alternative embodiment of the present disclosure, the electronic door plate may further comprise: a communication module, and the communication module may be configured for being wirelessly connected to a target device, and receiving an operating instruction sent by the target device; and the controlling module is electrically connected to the communication module, and the controlling module is configured for, in response to the operating instruction sent by the target device and received by the communication module, controlling the alarming device to perform an alarming operation.

As an example, the target device may be a calling machine used by a patient, an operation computer of a nursing station or an operation computer of a doctor office, and, correspondingly, the operating instruction may be a dressing changing request emitted by the patient by using the calling machine, a notice emitted by a nurse, a medical advice issued by a doctor, and so on. In practical applications, in response to the operating instruction received by the communication module, the controlling module may control the alarming device to perform an alarming operation, which facilitates an operator such as the medical staff and a patient relative to quickly locate the room corresponding to the electronic door plate, thereby increasing the efficiency of the handling on the patient by the operator.

In another alternative embodiment of the present disclosure, the electronic door plate may further comprise: a manipulating button, and the manipulating button is configured for receiving an operating instruction of a user; and the controlling module is electrically connected to the manipulating button, and the controlling module is configured for, in response to the operating instruction of the user received by the manipulating button, controlling the alarming device to perform an alarming operation.

As an example, the manipulating button may be fixed to the center frame 10 or the back cover 14, and is electrically connected to the controlling module, and the operating instruction may be a dressing changing request emitted by a patient by using a calling machine, a notice emitted by a nurse, a medical advice issued by a doctor, and so on. In practical applications, in response to the operating instruction received by the manipulating button, the controlling module may control the alarming device to perform an alarming operation, which facilitates an operator such as the medical staff and a patient relative to quickly locate the room corresponding to the electronic door plate, thereby increasing the efficiency of the handling on the patient by the operator.

In an embodiment of the present disclosure, the alarming device may comprise at least one of a lamplight alarming device 15 and a sound alarming device 16. The particular form of the alarming device is not particularly limited in the embodiments of the present disclosure.

Particularly, the lamplight alarming device 15 of the alarming device may be fixed to the side wall of the center frame 10, and is fixedly connected to the controlling module. Accordingly, by the controlling of the controlling module, the lamplight alarming device 15 can, by using the variations of the light and the color, enable the operator to quickly determine the ward in which a patient requires care.

As an example, the lamplight alarming device 15 may be provided at the left side wall and the right side wall of the center frame 10, or be provided at all of the four side walls of the center frame 10, which is not limited in the embodiments of the present disclosure.

Optionally, the light color and/or the flicker frequency of the lamplight alarming device 15 correspond to the type of the operating instruction, which facilitates the operator to quickly determine the contents of the operation.

In practical applications, it may be set that different light colors and flicker frequencies correspond to different operating instructions. For example, if the operating instruction is a dressing changing instruction emitted by a patient, the light color of the lamplight alarming device 15 may be green, and/or, the flicker frequency may be 30 times per second. As another example, if the operating instruction is an instruction emitted by a patient that he requires a rapid salvage, the light color of the lamplight alarming device 15 may be red, and/or, the flicker frequency may be 60 times per second.

In an embodiment of the present disclosure, as shown in FIGS. 2 and 3, the lamplight alarming device 15 may comprise: a light bar 151 and a light-bar cover plate 152; the light bar 151 is fixed to the side wall of the center frame 10, and is electrically connected to the controlling module; and the light-bar cover plate 152 covers the light bar 151.

Particularly, the light bar 151 may be provided with one elongate light emitting source or a plurality of granular light emitting sources, whereby the light bar 151 can emit light under the controlling of the controlling module. The light-bar cover plate 152 covers the light bar 151, to protect the light bar 151.

Particularly, the light-bar cover plate 152 may be a transparent light-bar cover plate, whereby the light emitted by the light bar 151 can exit via the light-bar cover plate 152. Optionally, the light-bar cover plate 152 may be made from a transparent acrylic plate or polycarbonate plate.

Optionally, a slot is provided on one side of the light-bar cover plate 152 that is closer to the light bar 151, and a diffusing soft-rubber structure 153 is embedded in the slot, whereby the light emitted by the light bar 151, after passing through the diffusing soft-rubber structure 153, can be displayed uniformly, which improves the uniformity of the displaying of the lamplight alarming device 15, and, in turn, can improve the usage experience of the user from the electronic door plate.

As shown in FIG. 3, a flanging part 1531 is provided on one side of the diffusing soft-rubber structure 153 that is closer to the light bar 151, and the flanging part 1531 protrudes out of the slot, whereby the diffusing soft-rubber structure 153 can sufficiently block the light bar 151, to prevent the light ray emitted by the light bar 151 from exiting from the area other than the diffusing soft-rubber structure 153, thereby further improving the uniformity of the displaying of the lamplight alarming device 15. Correspondingly, the light-bar cover plate 152 is provided with a blocking flange 1521 at the position corresponding to the flanging part 1531, and the blocking flange 1521 clings to and is connected to the flanging part 1531, whereby the light ray transmitted from the flanging part 1531 may exit via the blocking flange 1521.

Particularly, the diffusing soft-rubber structure 153 may be made from a transparent material that is added a light diffusant, such as a polyvinyl chloride, a polyamide elastomer, a polyolefin elastomer or a polyurethane elastomer. The light diffusant may include inorganic light diffusants, organic light diffusants and so on. Adding the light diffusant into the transparent material can increase the scattering and the transmission of the light, which, while the light bar 151 and the dazzling light source are blocked, can enable the diffusing soft-rubber structure 153 to emit lights that are milder, more aesthetically satisfactory and more exquisite, to realize an effect that light can be transmitted but illumination cannot be transmitted.

Optionally, the back cover 14 is provided with a through hole at the position corresponding to the lamplight alarming device 15, and the light-bar cover plate 152 is embedded in the through hole, whereby the light ray emitted by the lamplight alarming device 15 can pass through the through hole, to prevent the blocking of that light ray by the back cover 14.

Optionally, the sound alarming device 16 may be a buzzer. The buzzer may be fixed to the circuit board 11 and electrically connected to the controlling module at the circuit board 11. By the controlling of the controlling module, the buzzer may emit a sound, whereby the operator can quickly determine the ward in which a patient requires care.

Particularly, in order to facilitate the sound emitted by the buzzer to exit via the back cover 14, the back cover 14 may be provided with a sound emitting hole at the position corresponding to the buzzer.

As an example, the controlling module may be a chip or controlling circuit provided at the circuit board 11. The particular form of the controlling module is not limited in the embodiments of the present disclosure.

In conclusion, the electronic door plate according to the embodiments of the present disclosure has at least the following advantages:

In the embodiments of the present disclosure, by providing the alarming device in the electronic door plate, by the controlling of the controlling module at the circuit board, the alarming device can perform an alarming operation, to facilitate the operator to quickly locate the room corresponding to the electronic door plate. In other words, besides the traditional functions of interactive operation such as displaying and touch controlling, the electronic door plate further has the functions of prompting and locating, which diversifies the functions.

An embodiment of the present disclosure further provides a system for managing an electronic door plate. The managing system may particularly comprise: a calling machine, an upper computer and the electronic door plate stated above; and the electronic door plate, the calling machine and the upper computer are wirelessly connected.

In an embodiment of the present disclosure, the upper computer may be placed at a nursing station or a doctor office, and the calling machine may be provided aside the bed of a patient, to facilitate the patient to call by using the calling machine. Because the calling machine is wirelessly connected to the electronic door plate and the upper computer, when the patient is calling on the calling machine, the signal can be transmitted to the upper computer at the nursing station or the doctor office, and to the electronic door plate outside the ward, and then the electronic door plate can alarm by using a lamplight and/or a sound. Accordingly, when the nurse or the doctor has reached the floor, because the electronic door plate outside the ward can alarm by using a lamplight and/or a sound, that can facilitate the doctor or the nurse to quickly locate the room corresponding to the electronic door plate, which increases the speed of the handling on the patient by the nurse or the doctor.

In an embodiment of the present disclosure, the electronic door plate, the calling machine and the upper computer are wirelessly connected, the electronic door plate is provided with the alarming device, and the alarming device can perform an alarming operation, to facilitate the operator to quickly locate the room corresponding to the electronic door plate.

Finally, it should also be noted that, in the present text, relation terms such as first and second are merely intended to distinguish one entity or operation from another entity or operation, and that does not necessarily require or imply that those entities or operations have therebetween any such actual relation or order. Furthermore, the terms “include”, “comprise” or any variants thereof are intended to cover non-exclusive inclusions, so that processes, methods, articles or terminal devices that include a series of elements do not only include those elements, but also include other elements that are not explicitly listed, or include the elements that are inherent to such processes, methods, articles or terminal devices. Unless further limitation is set forth, an element defined by the wording “comprising a . . . ” does not exclude additional same element in the process, method, article or terminal device comprising the element.

The electronic door plate and the system for managing an electronic door plate according to the present disclosure have been described in detail above. The principle and the embodiments of the present disclosure are described herein with reference to the particular examples, and the description of the above embodiments is merely intended to facilitate to understand the method according to the present disclosure and its core concept. Moreover, for a person skilled in the art, according to the concept of the present disclosure, the particular embodiments and the range of application may be varied. In conclusion, the contents of the description should not be understood as limiting the present disclosure.

The invention claimed is:

1. An electronic door plate, wherein the electronic door plate comprises: a center frame, a circuit board, a display screen, a back cover and an alarming device;

the circuit board, the display screen and the alarming device are fixed to the center frame;

the back cover is provided on one side of the center frame that is further away from the display screen, and is fixedly connected to the center frame;

a controlling module is provided at the circuit board, and the controlling module is electrically connected to the alarming device; and the controlling module is configured for controlling the alarming device to perform an alarming operation, wherein the alarming operation enables an operator to locate a room corresponding to the electronic door plate;

wherein the alarming device comprises: at least one of a sound alarming device and a lamplight alarming device;

wherein the lamplight alarming device is fixed to a side wall of the center frame;

wherein the lamplight alarming device comprises: a light bar and a light-bar cover plate;

the light bar is fixed to the side wall of the center frame, and is electrically connected to the controlling module; and the light-bar cover plate covers the light bar;

wherein a slot is provided on one side of the light-bar cover plate that is closer to the light bar, and a diffusing soft-rubber structure is embedded in the slot;

wherein a flanging part is provided on one side of the diffusing soft-rubber structure that is closer to the light bar, and the flanging part protrudes out of the slot.

2. The electronic door plate according to claim 1, wherein the diffusing soft-rubber structure is made from a polyvinyl chloride, a polyamide elastomer, a polyolefin elastomer or a polyurethane elastomer each of which is added a light diffusant.

3. The electronic door plate according to claim 1, wherein the light-bar cover plate is a transparent light-bar cover plate.

4. The electronic door plate according to claim 1, wherein the back cover is provided with a through hole at a position corresponding to the lamplight alarming device, and the light-bar cover plate is embedded in the through hole.

5. The electronic door plate according to claim 1, wherein the sound alarming device is a buzzer.

6. The electronic door plate according to claim 1, wherein the electronic door plate further comprises: a cover plate, and the cover plate covers the display screen, and is fixedly connected to the center frame.

7. The electronic door plate according to claim 1, wherein the electronic door plate further comprises: a communication module, and the communication module is configured for being wirelessly connected to a target device, and receiving an operating instruction sent by the target device; and the controlling module is electrically connected to the communication module, and the controlling module is configured for, in response to the operating instruction sent by the target device and received by the communication module, controlling the alarming device to perform an alarming operation.

8. The electronic door plate according to claim 1, wherein the electronic door plate further comprises: a manipulating button, and the manipulating button is configured for receiving an operating instruction of a user; and the controlling module is electrically connected to the manipulating button, and the controlling module is configured for, in response to the operating instruction of the user received by the manipulating button, controlling the alarming device to perform an alarming operation.

9. The electronic door plate according to claim 1, wherein the display screen is an electronic-paper display screen.

10. The electronic door plate according to claim 1, wherein at least one of a light color and a flicker frequency of the lamplight alarming device corresponds to a type of an operating instruction of an operator.

11. The electronic door plate according to claim 1, wherein the light bar is provided with one elongate light emitting source, or is provided with a plurality of granular light emitting sources.

12. The electronic door plate according to claim 1, wherein the light-bar cover plate is provided with a blocking flange at a position corresponding to the flanging part, and the blocking flange clings to and is connected to the flanging part.

13. The electronic door plate according to claim 5, wherein the back cover is provided with a sound emitting hole at a position corresponding to the buzzer.

14. The electronic door plate according to claim 1, wherein the controlling module is a chip or controlling circuit provided at the circuit board.

15. A system for managing an electronic door plate, wherein the system comprises: a calling machine, an upper computer and the electronic door plate according to claim 1; and the electronic door plate, the calling machine and the upper computer are wirelessly connected.

* * * * *